(12) United States Patent
Michael

(10) Patent No.: US 8,700,455 B2
(45) Date of Patent: Apr. 15, 2014

(54) ADVERTISING REWARDS AND REFERRALS

(75) Inventor: Hopwood Michael, Jericho, VT (US)

(73) Assignee: Adobe Systems Incorporated, San Jose, CA (US)

( * ) Notice: Subject to any disclaimer, the term of this patent is extended or adjusted under 35 U.S.C. 154(b) by 1232 days.

(21) Appl. No.: 11/726,953

(22) Filed: Mar. 23, 2007

(65) Prior Publication Data

US 2013/0124282 A1 May 16, 2013

(51) Int. Cl.
*G06Q 30/00* (2012.01)
*G06F 17/30* (2006.01)

(52) U.S. Cl.
USPC .............. 705/14.16; 705/14.19; 705/14.44; 705/14.46; 707/771

(58) Field of Classification Search
USPC ............... 705/14, 14.69, 14.49, 14.53, 14.6, 705/14.44, 14.46, 14.16, 14.19; 725/46; 707/771
See application file for complete search history.

(56) References Cited

U.S. PATENT DOCUMENTS 5,794,210 A * 8/1998 Goldhaber et al. ........ 705/14.69
6,044,376 A * 3/2000 Kurtzman, II ..................... 1/1
2001/0029466 A1* 10/2001 Ichihara ............................ 705/14
2001/0034654 A1* 10/2001 Vigil et al. ........................ 705/14
2001/0056374 A1* 12/2001 Joao ................................. 705/14
2002/0062248 A1* 5/2002 Sakurai ............................ 705/14
2002/0103703 A1* 8/2002 Spetalnick ....................... 705/14
2003/0036944 A1* 2/2003 Lesandrini et al. ............. 705/10
2006/0004627 A1* 1/2006 Baluja ............................. 705/14
2006/0085254 A1* 4/2006 Grim et al. ....................... 705/14
2006/0149624 A1* 7/2006 Baluja et al. .................... 705/14
2006/0224452 A1* 10/2006 Ng .................................. 705/14
2006/0294547 A1* 12/2006 Bon et al. ........................ 725/46
2007/0226053 A1* 9/2007 Carl et al. ....................... 705/14

OTHER PUBLICATIONS

"What Are the Thumbs Up and Thumbs Down Buttons?" Jul. 5, 2003. <http://tivosupport2.instancy.com/TivoCollection/bb1d90ad-1925-4d9b-a4e9-0e9fe473569f/ins_content.html>.

* cited by examiner

*Primary Examiner* — John G Weiss
*Assistant Examiner* — Marilyn G Macasiano
(74) *Attorney, Agent, or Firm* — Wolfe-SBMC

(57) ABSTRACT

Advertising rewards and referrals are described, including detecting an interaction with an advertisement, recording the interaction, the interaction including an input being provided in response to the advertisement, generating a reward for the interaction, the reward being an action taken to provide a benefit in response to the interaction, analyzing data associated with the advertisement, the data including a plurality of documented interactions, and providing a result from analyzing the data.

30 Claims, 6 Drawing Sheets

ADVERTISING REWARDS AND REFERRALS

FIELD OF THE INVENTION

The present invention relates generally to software and online advertising. More specifically, advertising rewards and referrals are described.

BACKGROUND

Online advertising accounts for substantial revenue generated using media such as the Internet and World Wide Web ("web"). Conventionally, advertisers have only crude tools for determining whether an online advertisement is effective. The two most common conventional measures of advertising effectiveness available to advertisers are "impressions" (i.e., the number of users visiting the page where the advertisement was placed) or "click throughs" (i.e., the number of users that clicked on the advertisement). However, an advertisement is not necessarily effective simply because many users visited a web page ("page") where the advertisement was placed. Furthermore, although click through data can show advertisers the relative effectiveness of an advertisement, an advertisement can be effective without being clicked and a clicked advertisement can be poor or offensive in nature.

Another conventional method to determine advertising effectiveness is for an advertiser to perform market research by asking users to view an advertisement and provide a rating. However, market research is expensive and not very accurate, typically being performed under artificial conditions.

Further, an advertisement is more effective if it reaches a user who is interested in the product or service featured in the advertisement. Although advertisers can target their advertisements to a specific web site, some customers who would be interested in the product or service would not see the advertisement if they did not visit that specific web site.

Thus, a solution for assessing and increasing advertisement effectiveness without the limitations of conventional techniques is needed.

BRIEF DESCRIPTION OF THE DRAWINGS

Various examples are disclosed in the following detailed description and the accompanying drawings.

DETAILED DESCRIPTION

Figure 1:
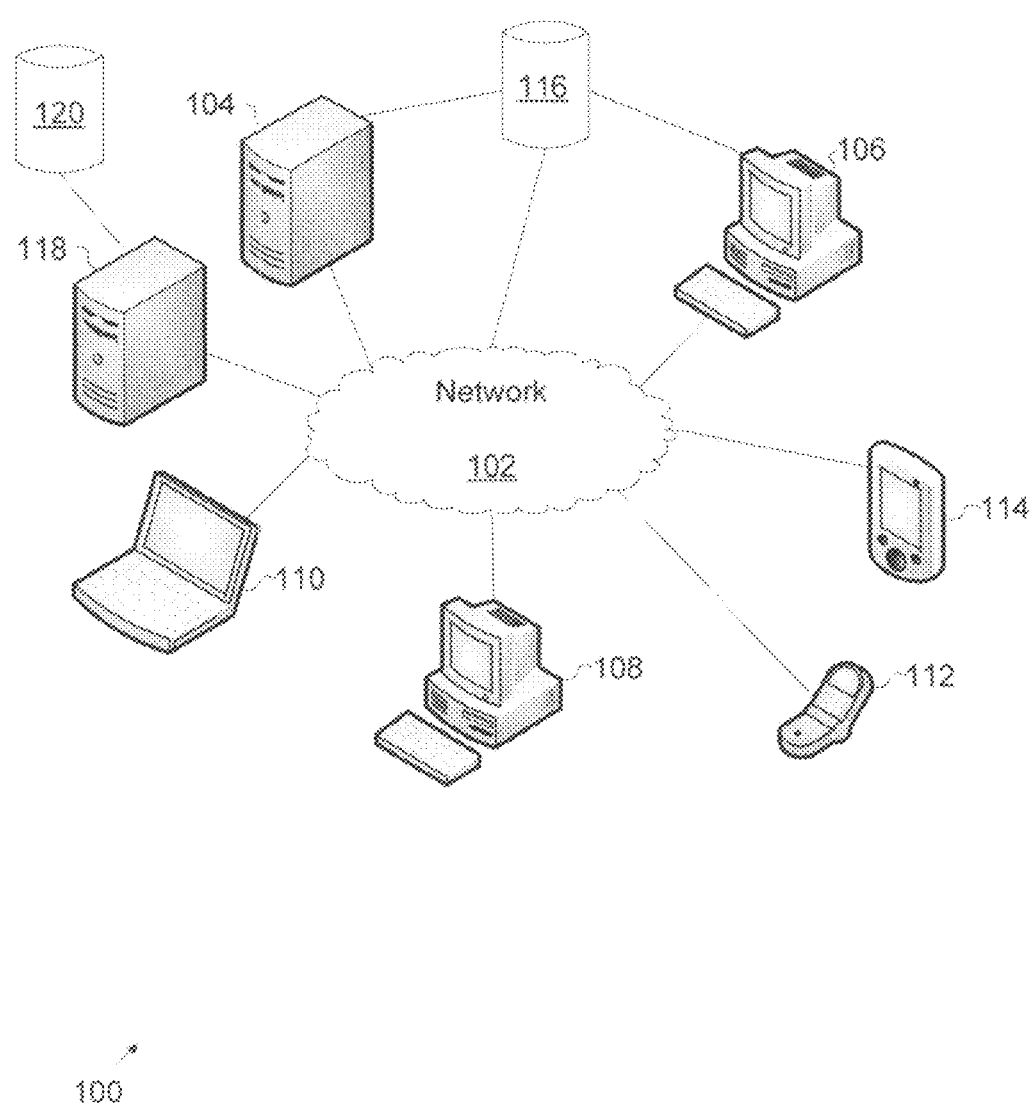
FIG. 1 illustrates an exemplary advertising reward system.

Various examples may be implemented in numerous ways, including as a system, a process, an apparatus, or a series of program instructions on a computer readable medium such as a computer readable storage medium or a computer network where the program instructions are sent over optical, electronic, or wireless communication links. In general, operations of disclosed processes may be performed in an arbitrary order, unless otherwise provided in the claims.

A detailed description of one or more examples is provided below along with accompanying figures. The detailed description is provided in connection with such examples, but is not limited to any particular example. The scope is limited only by the claims, and numerous alternatives, modifications, and equivalents are encompassed. Numerous specific details are set forth in the following description in order to provide a thorough understanding. These details are provided as examples and the described techniques may be practiced according to the claims without some or all of the accompanying details. For clarity, technical material that is known in the technical fields related to the examples has not been described in detail to avoid unnecessarily obscuring the description.

In some examples, the described techniques may be implemented as an application or as a module or sub-component of another application. The described techniques may be implemented as software, hardware, firmware, circuitry, or a combination thereof. If implemented as software, the described techniques may be implemented using various types of programming, development, scripting, or formatting languages, frameworks, syntax, applications, protocols, objects, or techniques, including C, Objective C, C++, C#, Flex™, Java™, Javascript™, Ajax, COBOL, Fortran, ADA, XML, HTML, DHTML, XHTML, HTTP, XMPP, and others. Design, publishing, and other types of applications such as Dreamweaver®, Shockwave®, and Fireworks® may also be used to implement the described techniques. The described techniques may be varied and are not limited to the examples or descriptions provided.

Advertising rewards and referrals are described, enabling feedback on advertisements or forwarding (i.e., referring to other users) of advertisements. In some examples, users may rank advertisements (e.g., good, bad, etc.) to qualify for a benefit (i.e., reward), which may be a direct or indirect monetary award, such as a donation to charity, an entry into a lottery to win cash or prizes, cash, or points in an incentive program, such as an airline mileage rewards program or frequent user program. Ranking information may be recorded and results may be provided that may show advertisers a variety of useful information, such as which advertisements are more effective, which web sites prefer a particular advertisement or set of advertisements, and which types of users respond more or less favorably to a given advertisement. In other examples, users may forward the advertisement to other users in order to qualify for a reward, allowing advertisers to reach customers that they otherwise may not have been able to reach or attract. By using advertising rewards and referrals, advertisers may have a more accurate assessment of whether an online advertisement is effective. Further, advertisers may use the described techniques to determine which web sites are generating positive or negative reactions or attitudes in response to their advertisements. Still further, advertisers may also implement the described techniques to receive real-time or substantially simultaneous feedback on advertisements in order to discontinue, enhance, refine, or otherwise modify poorly performing advertisements and advertising campaigns.

FIG. 1 illustrates an exemplary advertising reward system. Here, system 100 includes network 102, server 104, clients 106-114, database 116, server 118, and database 120. System 100 may be used to implement the described techniques for advertising rewards and referrals. In some examples, network 102 may be implemented using the Internet, a local area network (LAN), wide area network (WAN), municipal area network (MAN), wireless local area network (WLAN), or any other type or topology of network apart from those described herein. Further, direct and indirect connections and couplings may be provided between clients 106-114 across network 102, which may also be implemented using one or more networks. As an example, clients 106-144 may be implemented using a desktop or laptop computer, mobile computing device, personal digital assistant (PDA), smart phone, camera phone, and others. System 100 is not limited to any particular type of client and various types other than those described above may be used. Further, network connections or couplings between the above-described elements in system 100 may be varied and are also not limited to the examples provided.

In some examples, clients 106-114 may be implemented using various types of endpoint devices. For example, clients 106-108 may be implemented as personal computers (PC) or any other type of computing device. Further, clients 110-114 may be implemented as notebook/laptop computers, cell/smart phones, or personal digital assistants (PDAs), respectively. In other examples, clients 106-114 may be implemented as any type of computing device.

In other examples, server 104 may be implemented and used to deliver (i.e., serve) content, information, or data requested by one or more of clients 106-114. For example, content requested by client 106 may be performed using a web browsing application (not shown) installed on client 106. Content may include text, documents, files, images, photos, applications, or any type of information or data. When requested from server 104, content may be delivered to the requesting client (i.e., clients 106-114). In other examples, server 118 may be a server configured for a given purpose (e.g., ad server, web server, content server, application server, web services, gateway, and others). In yet other examples, server 118 may be a server network configured for a given purpose (e.g., ad server, web server, content server, application server, web services, gateway, and others). When requested from server 118, content may be delivered to the requesting client (i.e., clients 106-114). Techniques for advertising rewards and referrals such as those described herein may be implemented using the above-described system and topology. In some examples, advertising rewards and referrals may be performed locally on one or more of clients 106-114. In other examples, advertising rewards and referrals may be performed remotely or in a distributed manner using server 104, server 118, and one or more of clients 106-114. Further, other system configurations, topologies, clients, end and intermediate devices, and implementation techniques may be used and are not limited to those described above.

Figure 2:
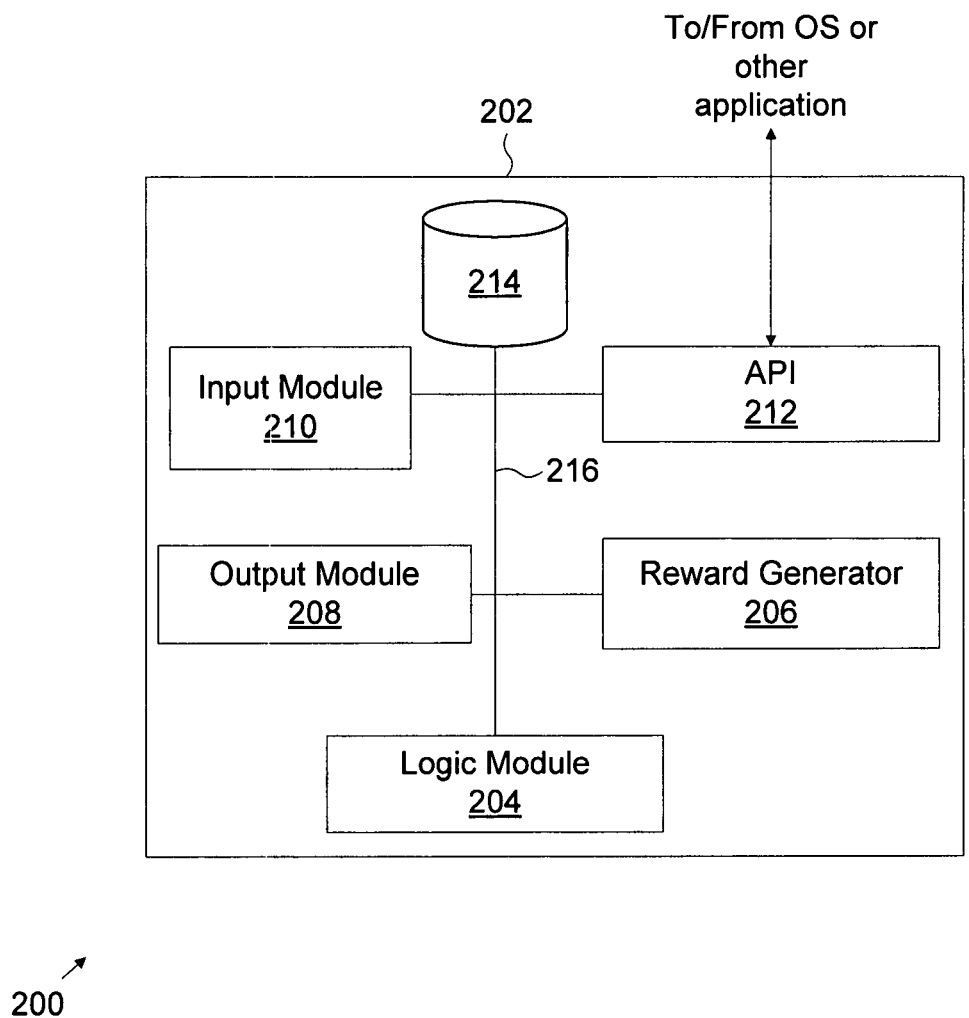
FIG. 2 illustrates an exemplary advertising reward application.

FIG. 2 illustrates an exemplary advertising reward application. Here, system 200 includes application 202, logic module 204, reward generator 206, output module 208, input module 210, application programming interface (API) 212, repository 214, and data bus 216. In some examples, logic module 204, reward generator 206, output module 208, input module 210, API 212, and repository 214 may be configured to transfer data between each other using data bus 216. In other examples, repository 214 may be a remote repository, which may be networked directly or indirectly to application 202. Data may be stored in either repository 214 or a remote repository (not shown), and data may be organized into files. Files may include data associated with documents, images, text, applications, program or software code, photos, or any other type of data that may be grouped together as a stream of bits (e.g., "1," "0," or any other data representation using binary, tertiary, or any other type of number system using a different mathematical base) that may be opened, accessed, launched, executed, run, downloaded, or otherwise operated upon as a single unit or instantiation. Further, files may include content such as editorial text, commercial advertisements ("ads"), or other content (e.g., files, advertisements, documents, articles, web sites and pages, videos, web services-delivered content and applications, and others) formatted in various types of formats using different applications (e.g., desktop, web browsing, messaging, e-mail, spreadsheet, and others). In some examples, files, when retrieved from repository 214, may be opened and launched based on the type of file retrieved. For example, an ad having video and audio data may be retrieved from repository 214. As another example, an ad having video and audio data may be streamed as a data stream from repository 214. As yet another example, an audio file may be downloaded, retrieved, streamed, or otherwise accessed from repository 214.

As an example, transaction flow initiated by an interaction with an ad may be communicated using API 212 from another application (e.g., web browsing, desktop, e-mail, messaging, or other) or operating system, thus enabling observation of user behavior such as typing text or interfacing with an application. Input module 210 may be configured to detect an interaction with an ad. Logic module 204 may be implemented to provide logic, control, coordination, command, signaling, and other functions and features for application 202. For example, logic module 204 may be configured to record an interaction having an input being provided in response to the ad. Reward generator 206 may be configured to generate a reward for the interaction, wherein the reward is an action taken to provide a benefit in response to the interaction. In some examples, the benefit may be a direct benefit to the user, such as a monetary benefit, an entry into a lottery to win cash or prizes, a point-based benefit for an airline mileage program, and others. In other examples, the benefit may be awarded on the user's behalf, such as a donation to a charitable organization or foundation and the like.

Here, logic module 204 may be configured to analyze data having one or more documented interactions. In some examples, a documented interaction may be an interaction that is observed and recorded, providing or storing data associated with the transaction in a repository or other system for use in determining the effectiveness of an advertising campaign or advertisement. Output module 208 may be configured to provide a result from analyzing data associate with an advertisement, advertising campaign, or interaction. Based on the result, in some examples, advertisers may modify the advertisement substantially simultaneous with the provided result. In other examples, advertisers may remove the advertisement substantially simultaneous with the provided result. In yet other examples, system 200 and the described elements may be varied in implementation, function, or structure and are not limited to the examples provided.

Figure 3A:
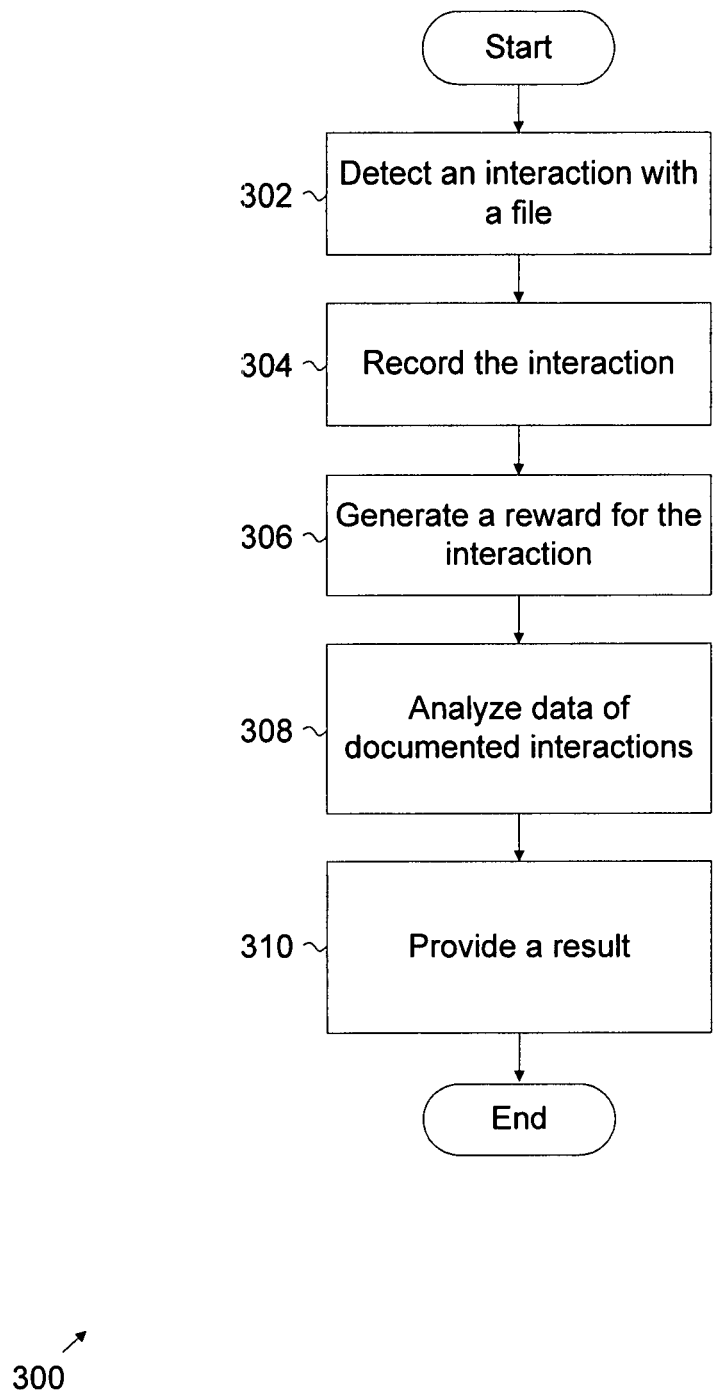
FIG. 3A illustrates an exemplary advertising reward process.

FIG. 3A illustrates an exemplary advertising reward process. Here, process 300 starts by detecting an interaction with a file (302). In some examples, the interaction may include an input (e.g., a user performing a mouse click, selecting an on-screen or displayed icon, and others) being provided in response to a file. A file may be, in some examples, an advertisement, advertising campaign, or other collection of data such that, when displayed, allows a user to click, select, move an icon over, or to otherwise interact or interface. In other examples, the file may be an advertisement having video data, multimedia content, text audio data, images, graphics, pictures, and other content types and formats. In still other examples, a file may be configured to allow a user to provide a the file may be configured to allow rating, forwarding of the file, user identification, or a combination thereof. If a file is configured to identify a user, the identification may be used to track a running or cumulative total of rewards provided to users interacting with the file. As an example, if the reward is a monetary benefit (e.g., ten cents ($0.10) awarded per each interaction, etc.), the identification may be used to track the accumulation of ten-cent rewards for a given user. As another example, if the reward is based on points awarded as airline miles (e.g., ten points per reward and one hundred points may be redeemed for one hundred and fifty airline miles) for redemption for tickets, goods, and the like, identification may be used to track the accumulation of points acquired thus far. Once detected, the interaction is recorded (304). Then, a reward is generated for the interaction, the reward being an action taken to provide a benefit in response to the interaction (306). In some examples, generating a reward for the interaction may be performed as further described below in connection with FIG. 3B. In other examples, the benefit may be a direct benefit to the user, such as a monetary benefit, an entry into a lottery to win cash or prizes, a point-based benefit toward airline miles or other incentives, and others. In still other examples, the benefit may be awarded on the user's behalf, such as a donation to a charitable organization or foundation, and others. Subsequently, data associated with the interaction is analyzed and which may be grouped or associated with other documented interactions (308). Once the data is analyzed, a result may be provided (310). As an example, a result may be a generated report that is sent or accessible by an advertiser, which may be used to determine the effectiveness of a given advertisement or advertising campaign. If, for example, an interactive banner advertisement is served and resulting user interaction is analyzed, a report may be generated that shows a 10% conversion ratio (i.e., ten (10) percent of the total number of copies of an advertisement that were served to requesting sites or locations resulted in users "clicking through" or another interaction). Based on this analysis of user interaction with the advertisement, the advertiser may decide to continue the campaign or to further target (i.e., serve the advertisement upon) other websites, pages, or destinations that are contextually similar to those that resulted in user interactions (e.g., click throughs, moving an icon over, selecting for download, forwarding to friends or other users, and others). In other examples, the above-described process may be varied and is not limited to the processes or sub-processes described above.

Figure 3B:
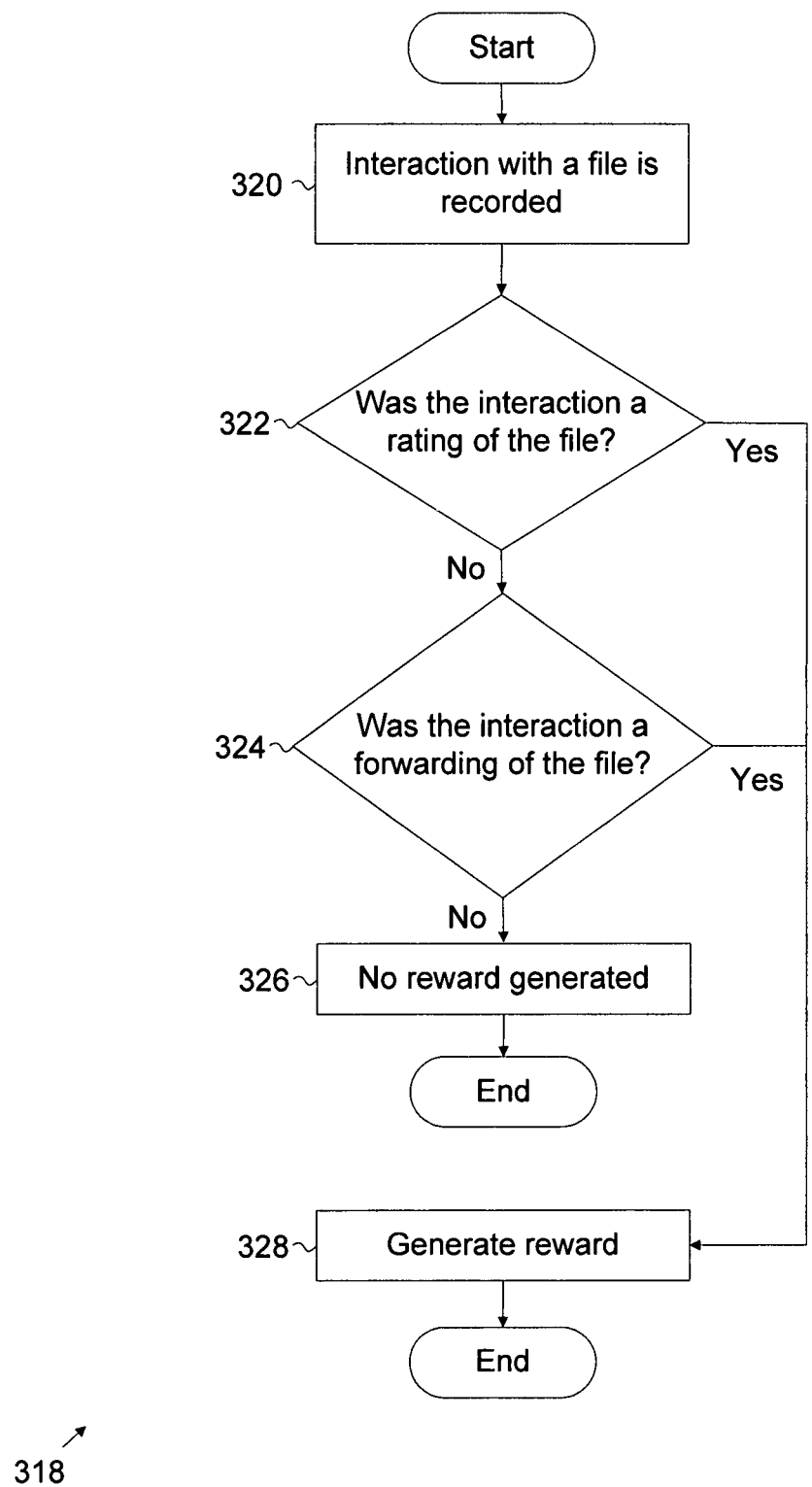
FIG. 3B illustrates an exemplary advertising reward sub-process.

FIG. 3B illustrates an exemplary advertising reward sub-process. In some examples, sub-process 318 further describes generating a reward (e.g., 306 (FIG. 3A)), as provided above. Here, an interaction with a file is recorded (320). In some examples, the interaction may include an input being provided in response to the file. In other examples, the file may be an advertisement that includes video data, multimedia content, text, audio data, or other content. Further, a file may be configured to allow user interactions such as providing a rating, allowing forwarding to friends or other users, or input of information to identify or gather profile data about a user, or a combination thereof. A determination is made as to whether the observed interaction was a rating of the file (322). In some examples, the rating of a file may be implemented using a ranking system. As an example, an interaction may be a user rating a file with positive feedback (e.g., five stars, "love it," etc.). As another example, an interaction may be the action or activity that occurs when a user rates a file with negative feedback (e.g., zero stars, "hate it," etc.). As yet another example, an interaction may be a user rating a file with neutral feedback (e.g., three stars, "neutral," inputting a "N/A" or other ambivalent input, and the like).

Here, if the interaction was a rating of the file, a reward is generated (328) and the process ends. In some examples, the reward may be a direct benefit to the user, such as a monetary benefit, an entry into a lottery to win cash or prizes, a point-based benefit toward airline miles or other incentives, and others. In other examples, the reward may be on the user's behalf, such as a donation to a charitable organization or foundation and others.

If the interaction was not a rating of the file, the process continues. A determination is then made as to whether the interaction was a forwarding of the file (324). As an example, an interaction that was a forwarding of the file may be when a user forwards the file to another user's e-mail. As another example, an interaction that was a forwarding of the file may be when a user forwards the file to another user's cell/smart phone.

Here, if the interaction was a forwarding of the file, a reward is generated (328) and the process ends. In some examples, the reward may be a direct benefit to the user, such as a monetary benefit, an entry into a lottery to win cash or prizes, a point-based benefit toward airline miles redemption programs, or others. In other examples, the reward may be on the user's behalf, such as a donation to a charitable organization or foundation.

If the interaction was neither a rating of the file nor a forwarding of the file, no reward is generated (326) and the process ends. In other examples, an advertiser may choose to reward other types of interactions, such as interfacing with an interactive system. As an example, an interactive system may be a system configured to allow the user to play the part of an extreme skier or a motorcycle rider. The above-described process may be varied in implementation, design, order, and function and is not limited to the examples provided above.

Figure 3C:
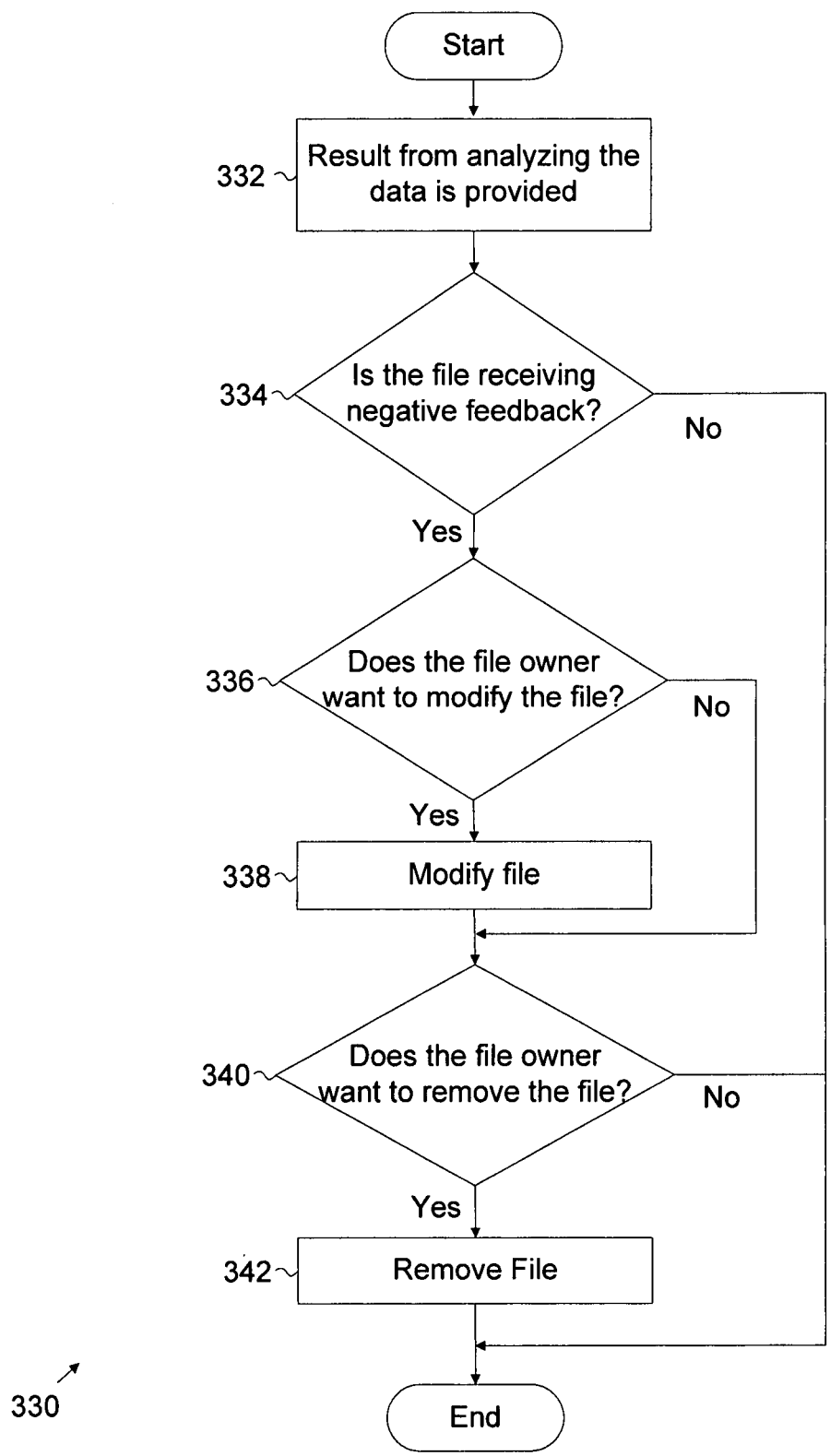
FIG. 3C illustrates another exemplary advertising reward sub-process.

FIG. 3C illustrates another exemplary advertising reward sub-process. In some examples, sub-process 330 describes an exemplary sub-process for modifying or removing a file when a result is provided. Here, a result is provided from analyzing the data (332) (e.g., 310 (FIG. 3A)). A determination is made as to whether the file is receiving negative feedback (334). As an example, negative feedback of a file may result if user interaction (i.e., ratings) shows that the file receives an average of two or fewer stars or if, for example, the result shows that more than half of the users do not like the advertisement (e.g., receiving interaction input such as "I hate this ad," "Never send me this ad or any like it," and the like). If the file is not receiving negative feedback, the process ends. If the file is receiving negative feedback, a determination is made as to whether the file owner wants to modify the file (336). In some examples, a file owner (e.g., advertiser) may want to modify the text (e.g., advertisement or advertising campaign), video data, multimedia content, audio data, or other content of a file, in order to improve the effectiveness of the file. For example, a threshold may be set such that if the file (e.g., advertisement or other type of content) is rejected a given number of times, the file may be removed manually or automatically. As another example, a threshold may be implemented such that if an average number of ratings (i.e., interactions) with a given file falls below a value (e.g., 3 out of 5 stars, 40% average approval, and the like), then the file may be manually or automatically removed, replaced, or otherwise modified. If the file owner wants to modify the file, the file is modified (338). If the file owner does not want to modify the file, a determination is made as to whether the file owner wants to remove the file (340). In some examples, a file owner may want to remove the file if the file is receiving negative feedback that indicates harm to a company or product brand or reputation. In other examples, a file owner may want to remove the file if the file is not performing well on a given web site. If the file owner wants to remove the file, the file is removed (342) and the process ends. If the file owner does not want to remove the file, the process ends. The above-described process may be varied in implementation, design, order, and function and is not limited to the examples provided above.

Figure 4:
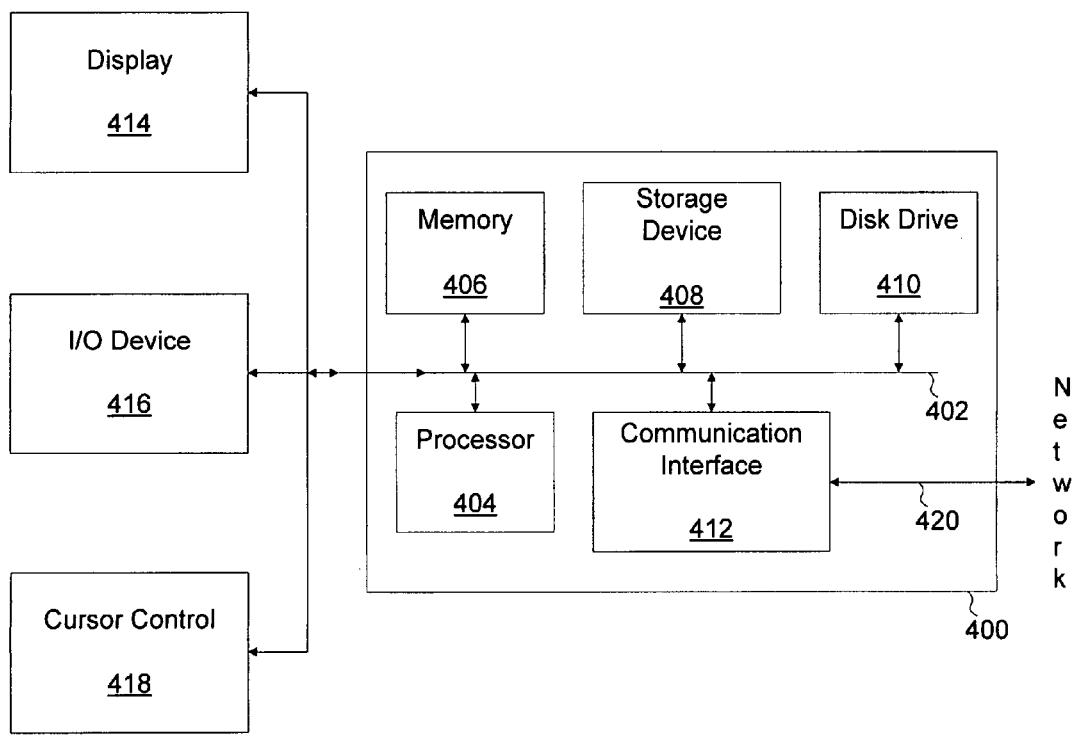
FIG. 4 illustrates an exemplary computer system suitable for advertising rewards.

FIG. 4 illustrates an exemplary computer system suitable for advertising rewards. In some examples, computer system 400 may be used to implement computer programs, applications, methods, processes, or other software to perform the above-described techniques. Computer system 400 includes a bus 402 or other communication mechanism for communicating information, which interconnects subsystems and devices, such as processor 404, system memory 406 (e.g., RAM), storage device 408 (e.g., ROM), disk drive 410 (e.g., magnetic or optical), communication interface 412 (e.g., modem or Ethernet card), display 414 (e.g., CRT or LCD), input device 416 (e.g., keyboard), and cursor control 418 (e.g., mouse or trackball).

According to some examples, computer system 400 performs specific operations by processor 404 executing one or more sequences of one or more instructions stored in system memory 406. Such instructions may be read into system memory 406 from another computer readable medium, such as static storage device 408 or disk drive 410. In some examples, hard-wired circuitry may be used in place of or in combination with software instructions for implementation.

The term "computer readable medium" refers to any medium that participates in providing instructions to processor 404 for execution. Such a medium may take many forms, including but not limited to, non-volatile media, volatile media, and transmission media. Non-volatile media includes, for example, optical or magnetic disks, such as disk drive 410. Volatile media includes dynamic memory, such as system memory 406. Transmission media includes coaxial cables, copper wire, and fiber optics, including wires that comprise bus 402. Transmission media can also take the form of acoustic or light waves, such as those generated during radio wave and infrared data communications.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer can read.

In some examples, execution of the sequences of instructions may be performed by a single computer system 400. According to some examples, two or more computer systems 400 coupled by communication link 420 (e.g., LAN, PSTN, or wireless network) may perform the sequence of instructions in coordination with one another. Computer system 400 may transmit and receive messages, data, and instructions, including program, i.e., application code, through communication link 420 and communication interface 412. Received program code may be executed by processor 404 as it is received, and/or stored in disk drive 410, or other non-volatile storage for later execution. In other examples, system 400 and the above-described elements may be varied and are not limited to the functions, structures, configurations, or implementations provided.

The foregoing examples have been described in some detail for purposes of clarity of understanding, but are not limited to the details provided. There are many alternative ways and techniques for implementation. The disclosed examples are illustrative and not restrictive.

What is claimed:

1. A method comprising:
performing, by a computer:
receiving, from a client device, a rating for an advertisement currently being served from a server during an interaction between a user of the client device and a copy of the advertisement displayed on the client device;
recording data about the interaction;
in response to said receiving the rating, generating a reward for the received rating including taking an action to provide a benefit to the user or on behalf of the user;
serving, from the server, the advertisement to a plurality of client devices;
repeating said receiving the rating, said recording the data, and said generating the reward for the received rating for a plurality of interactions between the plurality of client devices and the advertisement;
analyzing the recorded data for the plurality of interactions as a group including determining a number of times the advertisement is rejected; and
automatically modifying or replacing the advertisement currently being served from the server based at least in part on the number of times exceeding a threshold.

2. The method of claim 1, wherein said receiving includes receiving the rating from a ranking system.

3. The method of claim 1, wherein said receiving includes receiving the rating from an interactive system.

4. The method of claim 1, further comprising:
detecting another interaction between another user and another copy of the advertisement, wherein the other interaction includes the other user forwarding or referring the other copy of the advertisement to yet another user; and
in response to said detecting the other interaction, generating a reward for the other interaction including taking an action to provide a benefit to the other user or on behalf of the other user.

5. The method of claim 1, wherein the recorded data includes data identifying the user.

6. The method of claim 5, further comprising tracking an accumulation of rewards based at least in part on the data identifying the user.

7. The method of claim 1, wherein said generating the reward includes awarding one or more points.

8. The method of claim 1, further comprising sending a result of said analyzing to an advertiser of the advertisement substantially simultaneously with said analyzing.

9. The method of claim 1, further comprising, in response to said determining, performing said modifying or replacing substantially simultaneously with said determining.

10. The method of claim 1, further comprising:
based at least in part on said analyzing the recorded data, comparing a value dependent on the plurality of interactions to a threshold; and
preventing presentation of a copy of the advertisement to another user in response to determining that said value is less than the threshold.

11. The method of claim 10, wherein the value includes an average of the ratings from the plurality of users.

12. The method of claim 1, wherein said generating the reward further includes providing an indication of the reward to the client device.

13. A method comprising:
performing, by a computer:
receiving, from a client device, a rating for a file currently being served from a server during an interaction between a user of the client device and a copy of the file;

recording data about the interaction;

in response to said receiving the rating, generating a reward for the received rating including taking an action to provide a benefit to the user or on behalf of the user;

serving, from the server, the advertisement to a plurality of client devices;

repeating said receiving the rating, said recording the data, and said generating the reward for the received rating for a plurality of interactions between the plurality of client devices and the advertisement;

analyzing the recorded data for the plurality of interactions as a group including determining a value signifying negative feedback; and automatically modifying or replacing the file currently being served from the server based at least in part on a comparison of the value with a threshold.

14. The method of claim 13, wherein the file includes a web page.

15. The method of claim 13, wherein the file includes video data.

16. The method of claim 13, wherein the file includes text.

17. The method of claim 13, wherein the file includes audio data.

18. The method of claim 13, further comprising:

detecting another interaction between another user and another copy of the file, wherein the other interaction includes the other user forwarding or referring the other copy of the file to yet another user; and in response to said detecting the other interaction, generating a reward for the other interaction including taking an action to provide a benefit to the other user or on behalf of the other user.

19. The method of claim 13, further comprising sending a result of said analyzing to an owner of the file substantially simultaneously with said analyzing.

20. The method of claim 13, further comprising, in response to said determining, performing said modifying or replacing substantially simultaneously with said determining.

21. The method of claim 13, wherein the value includes an average of the ratings from the plurality of users; and the method further comprising removing the file in response to determining that the average is equal to or less than the threshold.

22. A system comprising:

a processor; and a memory storing data associated with an advertisement and instructions executable by the processor to:

receive, from a client device, a rating for an advertisement currently being served from a server during an interaction between a user of the client device and a copy of the advertisement displayed on the client device;

record data about the interaction;

in response to said receiving the rating, generate a reward for the received rating including taking an action to provide a benefit to the user or on behalf of the user;

serve, from the server, the advertisement to a plurality of client devices;

repeat said receiving the rating, said recording the data, and said generating the reward for the received rating for a plurality of interactions between the plurality of client devices and the advertisement;

analyze the recorded data for the plurality of interactions as a group including determining a value signifying negative feedback; and automatically modify or replace the advertisement currently being served from the server based at least in part on a comparison of the value with a threshold.

23. The system of claim 22, wherein the instructions are further executable to send a result of said analyzing to an advertiser for the advertisement substantially simultaneously with said analyzing.

24. The system of claim 22, wherein the instructions are further executable by the processor to, in response to said determining, perform said modifying or replacing substantially simultaneously with said determining.

25. A system comprising:

a database storing data associated with a file being served from a server; and a processor and memory storing program logic executable by the processor to:

receive, from a client device, a rating for the file currently being served from the server during an interaction between a user of the client device and a copy of the file;

record data about the interaction;

in response to said receiving the rating, generate a reward for the received rating including taking an action to provide a benefit to the user or on behalf of the user;

serve, from the server, the advertisement to a plurality of client devices;

repeat said receiving the rating, said recording the data, and said generating the reward for the received rating for a plurality of interactions between the plurality of client devices and the advertisement;

analyze the recorded data for the plurality of interactions as a group including determining a value signifying negative feedback; and automatically modify or replace the file currently being served from the server based at least in part on a comparison of the value with a threshold.

26. The system of claim 25, wherein the file includes a web page.

27. The system of claim 25, wherein the program logic is further executable by the processor to send a result of said analyzing to an owner of the file substantially simultaneously with said analyzing.

28. The system of claim 25, wherein the program logic is further executable by the processor to, in response to said determining, perform said modifying or replacing substantially simultaneously with said determining.

29. One or more computer readable storage medium comprising instructions stored thereon that, responsive to execution by a computing device, cause the computing device to perform operations comprising:

receiving, from a client device, a rating for an advertisement currently being served from a server during an interaction between a user of the client device and a copy of the advertisement displayed on the client device;

recording data about the interaction;

in response to said receiving the rating, generating a reward for the received rating including taking an action to provide a benefit to the user or on behalf of the user;

serving, from the server, the advertisement to a plurality of client devices;

repeating said receiving the rating, said recording the data, and said generating the reward for the received rating for a plurality of interactions between the plurality of client devices and the advertisement;

analyzing the recorded data for the plurality of interactions as a group including determining a number of times the advertisement is rejected; and automatically modifying or replacing the advertisement currently being served from the server based at least in part on the number of times exceeding a threshold.

30. One or more computer readable storage medium comprising instructions stored thereon that, responsive to execution by a computing device, cause the computing device to perform operations comprising:

receiving, from a client device, a rating for a file currently being served from a server during an interaction between a user of the client device and a copy of the file;

recording data about the interaction;

in response to said receiving the rating, generating a reward for the received rating including taking an action to provide a benefit to the user or on behalf of the user;

serving, from the server, the advertisement to a plurality of client devices repeating said receiving the rating, said recording the data, and said generating the reward for the received rating for a plurality of interactions between the plurality of client devices and the advertisement;

analyzing the recorded data for the plurality of interactions as a group including determining an average rating signifying negative feedback; and automatically modifying or replacing the file currently being served from the server based at least in part on a comparison of the average rating with a threshold.

* * * * *